United States Patent
Nishimura

(10) Patent No.: US 8,273,804 B2
(45) Date of Patent: Sep. 25, 2012

(54) RUBBER COMPOSITION FOR TIRE AND STUDLESS TIRE

(75) Inventor: Akihiro Nishimura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 93 days.

(21) Appl. No.: 12/983,338

(22) Filed: Jan. 3, 2011

(65) Prior Publication Data

US 2011/0166254 A1 Jul. 7, 2011

(30) Foreign Application Priority Data

Jan. 4, 2010 (JP) ................................. 2010-000112

(51) Int. Cl.
*C08J 5/14* (2006.01)

(52) U.S. Cl. ..... 523/155; 423/335; 525/355; 152/209.1; 152/905; 524/575.5; 524/493; 524/496

(58) Field of Classification Search .................... 523/155
See application file for complete search history.

(56) References Cited

U.S. PATENT DOCUMENTS

| | | | | |
|---|---|---|---|---|
| 2005/0027060 A1* | 2/2005 | Yagi et al. | ...................... | 524/493 |
| 2005/0234186 A1* | 10/2005 | Kondou | ...................... | 524/575.5 |
| 2006/0252879 A1* | 11/2006 | Tanaka et al. | .................. | 524/571 |
| 2007/0059232 A1* | 3/2007 | Stenzel et al. | ................. | 423/335 |

FOREIGN PATENT DOCUMENTS

| | | |
|---|---|---|
| JP | 2007-169431 A | 7/2007 |
| JP | 2010-174169 * | 8/2010 |

OTHER PUBLICATIONS

Machine translation of JP 2010-174169.*
Rhodia Silcea press release, Feb. 27, 2007.*

* cited by examiner

*Primary Examiner* — Doris Lee
(74) *Attorney, Agent, or Firm* — Birch, Stewart, Kolasch & Birch, LLP

(57) ABSTRACT

An object of the present invention is to provide a rubber composition for a tire, which can achieve well-balanced improvement in fuel economy, abrasion resistance, and performance on ice and snow, and a studless tire for a passenger vehicle using the rubber composition. The present invention relates to a rubber composition for a tire, including a rubber component and silica, wherein the rubber component contains a modified natural rubber with a phosphorus content of 200 ppm or less, and butadiene rubber, and the silica has a CTAB specific surface area of 180 $m^2/g$ or more and a BET specific surface area of 185 $m^2/g$ or more.

19 Claims, 1 Drawing Sheet

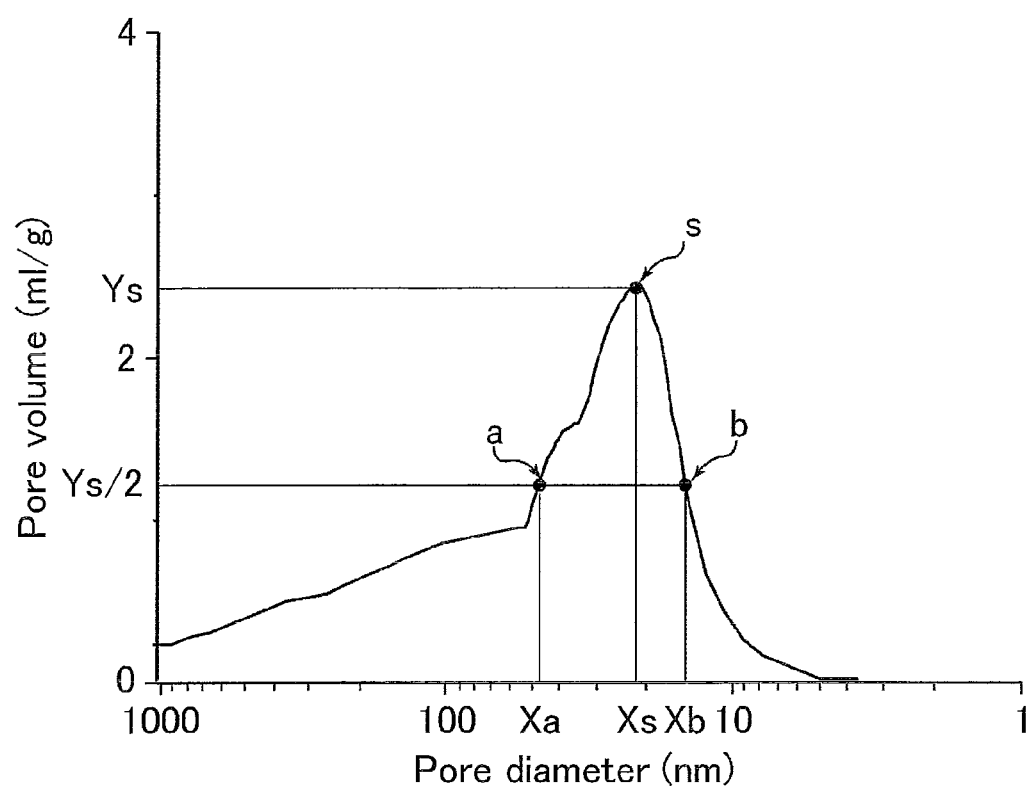

RUBBER COMPOSITION FOR TIRE AND STUDLESS TIRE

TECHNICAL FIELD

The present invention relates to a rubber composition for a tire and a studless tire (winter tire) for a passenger vehicle using the same for a tread.

BACKGROUND ART

Use of spike tires has been banned by law in Japan so as to prevent powder dust pollution resulting from the use of spike tires, and thus studless tires are now used instead of the spike tires in cold regions. Studless tires have been improved in their materials and designs, and for example, a rubber composition containing diene rubber having excellent low-temperature properties has been proposed.

In recent years, there have been demands for a tire showing excellent fuel economy as a studless tire for passenger vehicles from the environmental viewpoint. In order to obtain good fuel economy, the rubber composition for a tire has a rubber component mainly containing natural rubber in many cases.

However, in the case that rolling resistance is lowered to improve fuel economy, abrasion resistance tends to be lowered because fuel economy and abrasion resistance often conflict with each other. Accordingly, simultaneous improvement of both the performances is commonly hard. In addition, though studless tires are also demanded to show better performance on ice and snow (grip performance on ice and snow), this performance also conflicts with fuel economy in many cases. Therefore, well-balanced improvement of these performances is difficult.

Patent Document 1 discloses a rubber composition prepared using natural rubber and epoxidized natural rubber in order to increase the content of non-petroleum resources. However, the rubber composition still has room for well-balanced improvement in fuel economy, abrasion resistance, and performance on ice and snow.
Patent Document 1: JP 2007-169431 A

SUMMARY OF THE INVENTION

The present invention aims to provide a rubber composition for a tire, which solves the above problems and can achieve well-balanced improvement in fuel economy, abrasion resistance, and performance on ice and snow. It is also an aim of the present invention to provide a studless tire for a passenger vehicle using the rubber composition.

The present invention relates to a rubber composition for a tire, including a rubber component and silica, wherein the rubber component contains a modified natural rubber with a phosphorus content of 200 ppm or less, and butadiene rubber, and the silica has a CTAB specific surface area of 180 $m^2/g$ or more and a BET specific surface area of 185 $m^2/g$ or more.

The modified natural rubber preferably has a gel content of 20% by mass or less, the gel content being determined as the content of a toluene-insoluble matter. Preferably, the modified natural rubber has no phospholipid peak in a range of −3 to 1 ppm in a $^{31}P$ NMR measurement of a chloroform extract thereof and contains substantially no phospholipids. The modified natural rubber preferably contains 0.3% by mass or less of nitrogen. The modified natural rubber is preferably produced by saponifying natural rubber latex.

The silica preferably has an aggregate size of 30 nm or more.

The rubber composition for a tire is preferably used for a tread of a studless tire.

The present invention also relates to a studless tire for a passenger vehicle, including a tread produced using the rubber composition.

The present invention provides a rubber composition for a tire, including a modified natural rubber with a small phosphorus content and butadiene rubber as a rubber component, and further including finely-divided silica that has a certain CTAB specific surface area and a certain BET specific surface area. Therefore, by using the rubber composition for a tread of a studless tire, it is possible to provide a studless tire for passenger vehicles which achieves well-balanced improvement in fuel economy, abrasion resistance, and performance on ice and snow.

BRIEF DESCRIPTION OF THE DRAWINGS

FIG. 1 is a view illustrating a pore distribution curve.

BEST MODE FOR CARRYING OUT THE INVENTION

The rubber composition for a tire of the present invention includes a modified natural rubber (HPNR) with a small phosphorus content, butadiene rubber (BR), and finely-divided silica having a certain CTAB specific surface area and a certain BET specific surface area. The present invention employs a modified natural rubber (HPNR) with reduced or no levels of proteins, gel fraction, and phospholipids contained in natural rubber (NR), and therefore, fuel economy can be further improved compared to the case in which NR is used. However, anti-degradation components in NR are removed in synthesis of HPNR by NR saponification or the like treatment. This causes early degradation of rubber, resulting in lowering of the performances such as abrasion resistance. The present invention uses HPNR and BR as a rubber component, and further uses finely-divided silica. Therefore, both fuel economy and abrasion resistance can be improved and these two performances can be favorably achieved. In addition, excellent grip performance on ice and snow can be also achieved, leading to well-balanced improvement in fuel economy, abrasion resistance, and performance on ice and snow.

The modified natural rubber (HPNR) has a phosphorus content of 200 ppm or less. A phosphorus content of more than 200 ppm tends to cause an increase in the gel content during storage and an increase in the tan δ of the vulcanized rubber composition. The phosphorus content is preferably 150 ppm or less, and more preferably 100 ppm or less. Here, the phosphorus content can be measured by a conventional method such as ICP emission spectrometry. The phosphorus is derived from phospholipids (phosphorus compounds).

The modified natural rubber preferably has a gel content of 20% by mass or less, and more preferably 10% by mass or less. A gel content of more than 20% by mass tends to result in reduced processability such as increased Mooney viscosity. The gel content refers to the amount determined as a matter insoluble in toluene that is a non-polar solvent. Hereinafter, this content is also referred to simply as "gel content" or "gel fraction". The gel content is determined by the following method. First, a natural rubber sample is immersed in dehydrated toluene and is allowed to stand for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is added with methanol to be solidified, and is then dried. Finally, the gel content can be determined from the ratio of the mass of the dried gel fraction to the mass of the original sample.

The modified natural rubber preferably contains substantially no phospholipids. Here, the phrase "contains substantially no phospholipids" means that no phospholipid peak is present in a range of −3 to 1 ppm in a $^{31}$P NMR measurement of an extract obtained by chloroform extraction from a natural rubber sample. The phospholipid peak present in a range of −3 to 1 ppm refers to a peak corresponding to a phosphate ester structure in the phosphorus component of phospholipids.

The modified natural rubber preferably contains 0.3% by mass or less, and more preferably 0.15% by mass or less of nitrogen. A nitrogen content of more than 0.3% by mass tends to cause an increase in Mooney viscosity during storage. The nitrogen is derived from proteins. The nitrogen content can be determined by a conventional method such as the Kjeldahl method.

Examples of the method for producing the modified natural rubber include a method for producing a modified natural rubber by saponifying natural rubber latex with an alkali, washing a rubber coagulated therefrom after the saponification, and then drying the rubber. The saponification is performed by adding an alkali and optionally a surfactant to natural rubber latex and allowing the mixture to stand for a certain period at a predetermined temperature. Here, the mixture may optionally be stirred or subjected to other operations. The production method removes phosphorus compounds, which are separated in the saponification, by washing, and thereby can reduce the phosphorus content in natural rubber. Further, the saponification degrades proteins in natural rubber, and thereby can reduce the nitrogen content in natural rubber. In the present invention, the saponification can be performed by adding an alkali to natural rubber latex, and the addition to natural rubber latex advantageously leads to efficient saponification.

Natural rubber latex is sap extracted from hevea trees and contains components such as water, proteins, lipids, and inorganic salts as well as a rubber component. The gel fraction in rubber is thought to be derived from a complex of various impurities in rubber. The latex used in the present invention may be raw latex taken from hevea trees by tapping the trees, or purified latex concentrated by centrifugation. Alternatively, high ammonia latex may be used which is produced by adding ammonia to raw rubber latex through a common method so as to inhibit the corruption of raw rubber latex due to bacteria existing in the latex and to prevent coagulation of the latex.

Examples of the alkali used in the saponification include sodium hydroxide, potassium hydroxide, calcium hydroxide, and amine compounds. Among these, sodium hydroxide and potassium hydroxide are particularly preferable for good saponifying effect and stability of natural rubber latex.

The addition amount of the alkali is not particularly limited. The minimum addition amount of the alkali is preferably 0.1 parts by mass or more, and more preferably 0.3 parts by mass or more, per 100 parts by mass of the solids in natural rubber latex. The maximum addition amount of the alkali is preferably 12 parts by mass or less, more preferably 10 parts by mass or less, further preferably 7 parts by mass or less, and particularly preferably 5 parts by mass or less, per 100 parts by mass of the solids in natural rubber latex. An addition amount of the alkali of less than 0.1 parts by mass may cause a long-time saponification. On the other hand, an addition amount of the alkali of more than 12 parts by mass may destabilize natural rubber latex.

The surfactant to be used may be an anionic surfactant, a nonionic surfactant, or an ampholytic surfactant. Examples of the anionic surfactant include carboxylic acid anionic surfactants, sulfonic acid anionic surfactants, sulfate anionic surfactants, and phosphate anionic surfactants. Examples of the nonionic surfactant include polyoxyalkylene ether nonionic surfactants, polyoxyalkylene ester nonionic surfactants, polyhydric alcohol fatty acid ester nonionic surfactants, sugar fatty acid ester nonionic surfactants, and alkylpolyglycoside nonionic surfactants. Examples of the ampholytic surfactant include amino acid ampholytic surfactants, betaine ampholytic surfactants, and amine oxide ampholytic surfactants.

The minimum addition amount of the surfactant is preferably 0.01 parts by mass or more, and more preferably 0.1 parts by mass or more per 100 parts by mass of the solids in natural rubber latex. The maximum addition amount of the surfactant is preferably 6 parts by mass or less, more preferably 5 parts by mass or less, further preferably 3.5 parts by mass or less, and particularly preferably 3 parts by mass or less per 100 parts by mass of the solids in natural rubber latex. An addition amount of the surfactant of less than 0.01 parts by mass may cause destabilization of natural rubber latex during the saponification. On the other hand, an addition amount of the surfactant of more than 6 parts by mass may excessively stabilize natural rubber latex, which may make it difficult for the natural rubber latex to coagulate.

The temperature during the saponification can be appropriately set within a range that allows the saponification with an alkali to proceed at a sufficient reaction rate, and within a range that does not cause natural rubber latex to be subjected to denaturation such as coagulation. Generally, the temperature during the saponification is preferably 20° C. to 70° C., and more preferably 30° C. to 70° C. Although it depends on the temperature during the saponification, the time period of the saponification, in the case of allowing natural rubber latex to stand statically, is preferably 3 to 48 hours, and more preferably 3 to 24 hours for sufficient saponification and improvement of productivity.

After the saponification, coagulation is performed and the coagulated rubber is broken up and then washed. Examples of the coagulation method include a method in which an acid such as formic acid is added to latex so as to adjust the pH of the latex. Examples of the washing method include a method in which the coagulated rubber is diluted with water for washing, and the mixture is centrifuged to extract the rubber. Before the centrifugation, the dilution with water is first performed so that the content of the rubber formed from natural rubber latex is 5 to 40% by mass, and preferably 10 to 30% by mass. Next, the diluted rubber mixture may be centrifuged for 1 to 60 minutes at 5000 to 10000 rpm. After the completion of washing, a saponification-treated natural rubber latex can be produced. Then, the saponification-treated natural rubber latex is dried to provide the modified natural rubber of the present invention.

In the production method, the saponification, washing, and drying are preferably completed within 15 days after natural rubber latex is extracted. Further, it is more preferable to complete the saponification, washing, and drying within 10 days, and further preferably within 5 days after the latex is extracted. This is because the gel content increases if the latex is left to stand for more than 15 days without being solidified after extraction.

In the rubber composition of the present invention, the amount of the modified natural rubber in 100% by mass of the rubber component is preferably 30% by mass or more, more preferably 50% by mass or more, and further preferably 55% by mass or more. An amount of the modified natural rubber of less than 30% by mass may lower mechanical strength. The amount of the modified natural rubber in 100% by mass of the rubber component is preferably 80% by mass or less, more preferably 70% by mass or less, and further preferably 65% by mass or less. An amount of the modified natural rubber of more than 80% by mass may be less likely to provide needed wet grip performance.

The present invention uses BR as a rubber component. Use of BR can improve abrasion resistance.

The BR is not particularly limited, and the usable BRs include BRs with a high cis-content such as BR 1220 produced by ZEON CORPORATION, and BR130B and BR150B produced by UBE INDUSTRIES, LTD., and syndiotactic polybutadiene crystal-containing BRs such as VCR412 and VCR617 produced by UBE INDUSTRIES, LTD. BRs with a cis content of 85% by mass or more are preferable among these from the standpoint of improving abrasion resistance.

The amount of the BR in 100% by mass of the rubber component is preferably 20% by mass or more, more preferably 30% by mass or more, and further preferably 35% by mass or more. An amount of the BR of less than 20% by mass is less likely to achieve abrasion resistance and crack resistance as desired. The amount of the BR in 100% by mass of the rubber component is preferably 60% by mass or less, more preferably 50% by mass or less, and further preferably 45% by mass or less. An amount of the BR of more than 60% by mass leads to a lower HPNR content, which may result in failure in achieving mechanical strength and wet grip performance as desired.

Other usable rubbers in the rubber composition of the present invention include natural rubber (NR), isoprene rubber (IR), styrene butadiene rubber (SBR), acrylonitrile butadiene rubber (NBR), chloroprene rubber (CR), and butyl rubber (IIR).

The rubber composition of the present invention contains silica having a CTAB specific surface area of 180 m$^2$/g or more and a BET specific surface area of 185 m$^2$/g or more (hereinafter, also referred to as "finely-divided silica"). Favorable dispersion of such finely-divided silica in the rubber component including HPNR and BR can improve abrasion resistance, and therefore, well-balanced improvement of fuel economy, abrasion resistance, and grip performance on ice and snow is achieved.

The CTAB (cetyltrimethylammonium bromide) specific surface area of the finely-divided silica is preferably 190 m$^2$/g or more, more preferably 195 m$^2$/g or more, and further preferably 197 m$^2$/g or more. If the CTAB specific surface area is less than 180 m$^2$/g, mechanical strength and abrasion resistance are less likely to be sufficiently improved. The CTAB specific surface area is preferably 600 m$^2$/g or less, more preferably 300 m$^2$/g or less, and further preferably 250 m$^2$/g or less. If the CTAB specific surface area exceeds 600 m$^2$/g, the silica may agglomerate due to the inferior dispersibility, and therefore physical properties tend to be deteriorated.

The CTAB specific surface area is measured in conformity with ASTM D3765-92.

The BET specific surface area of the finely-divided silica is preferably 190 m$^2$/g or more, more preferably 195 m$^2$/g or more, and further preferably 210 m$^2$/g or more. If the BET specific surface area is less than 185 m$^2$/g, mechanical strength and abrasion resistance are less likely to be sufficiently improved. The BET specific surface area is preferably 600 m$^2$/g or less, more preferably 300 m$^2$/g or less, and further preferably 260 m$^2$/g or less. If the BET specific surface area exceeds 600 m$^2$/g, the silica may agglomerate due to the inferior dispersibility, and therefore physical properties tend to be deteriorated.

The BET specific surface area of the silica is measured in conformity with ASTM D3037-81.

The aggregate size of the finely-divided silica is preferably 30 nm or more, more preferably 35 nm or more, still more preferably 40 nm or more, further preferably 45 nm or more, particularly preferably 50 nm or more, more particularly preferably 55 nm or more, and most preferably 60 nm or more. The aggregate size thereof is preferably 100 nm or less, more preferably 80 nm or less, further preferably 70 nm or less, and particularly preferably 65 nm or less. The aggregate size of the finely-divided silica in such a range allows the finely-divided silica to have good dispersibility, as well as excellent reinforcement and abrasion resistance. As a result, the effects of the present invention are favorably achieved.

The aggregate size is also called an aggregate diameter or a maximum frequency Stokes equivalent diameter, and means a particle size in the case where a silica aggregate formed by aggregation of a plurality of primary particles is regarded as one particle. The aggregate size may be measured with a disk centrifugal sedimentation granulometric analysis apparatus such as BI-XDC (produced by Brookhaven Instruments Corporation), for instance.

More specifically, the aggregate size may be measured with BI-XDC by the following method.

3.2 g of silica and 40 mL of deionized water are added to a 50-mL tall beaker, and the beaker containing the silica suspension is placed into a crystallizer filled with ice. In the beaker, the suspension is deagglomerated with an ultrasonic probe (1500-W 1.9-cm VIBRACELL ultrasonic probe (produced by Bioblock, used at 60% of the maximum power output)) for 8 minutes to prepare a sample. 15 mL of the sample is introduced into a disk, stirred, and measured under the conditions of a fixed mode, an analysis time of 120 minutes, and a density of 2.1.

In the apparatus recorder, the values of the diameters passing at 16% by mass, 50% by mass (or median) and 84% by mass and the value of the Mode are recorded (the derivative of the cumulative granulometric curve gives a frequency curve, the abscissa of the maximum of which is known as the "Mode").

By the disk centrifugal sedimentation granulometric analysis method, an average size (by mass) of the particles (i.e. aggregates), marked $D_w$, can be measured after the silica is dispersed in water by ultrasonic deagglomeration. After analysis (sedimentation for 120 minutes), the particle size distribution by mass is calculated by the granulometric analysis apparatus. The average size (by mass) of the particles, marked $D_w$, is calculated by the following equation:

$$\log D_w = \sum_1^n m_i \log D_i \Big/ \sum_1^n m_i$$

(In the formula, $m_i$ is the total mass of the particles in the class of $D_i$).

The average primary particle size of the finely-divided silica is preferably 25 nm or less, more preferably 22 nm or less, further preferably 17 nm or less, and particularly preferably 14 nm or less. The lower limit of the average primary particle size is not particularly limited, and is preferably 3 nm or more, more preferably 5 nm or more, and further preferably 7 nm or more. Although the finely-divided silica has such a small average primary particle size, it also has the aforementioned aggregate size and therefore a structure like that of carbon black. Accordingly, the silica dispersibility is more improved, which further improves reinforcement and abrasion resistance. Thus, the effects of the present invention are favorably achieved.

The average primary particle size of the finely-divided silica may be determined by observing the silica with a transmission or scanning electron microscope, measuring the sizes of 400 or more primary particles of the silica observed in the visual field, and averaging the sizes of the 400 or more primary particles.

The D50 of the finely-divided silica is preferably 7.0 µm or less, more preferably 5.5 µm or less, and further preferably 4.5 µm or less. If the D50 exceeds 7.0 µm, the silica is actually more poorly dispersed. The D50 of the finely-divided silica is preferably 2.0 µm or more, more preferably 2.5 µm or more, and further preferably 3.0 µm or more. If the D50 is less than 2.0 µm, the aggregate size also tends to be small, and the finely-divided silica is less likely to be sufficiently dispersed.

The D50 as used herein is a median diameter of the finely-divided silica than which 50% by mass of the particles are smaller.

In the finely-divided silica, the proportion of the finely-divided silica whose particle size is larger than 18 µm is preferably 6% by mass or less, more preferably 4% by mass or less, and further preferably 1.5% by mass or less. Thereby, the silica is favorably dispersed, and desired performances are achieved.

The D50 of the finely-divided silica and the proportion of the silica having a specific particle size are determined by the following method.

The agglomeration of aggregates is estimated by granulometric measurement (by laser diffraction) carried out on a silica suspension previously deagglomerated by ultrasonication. In this method, the aptitude of the silica for deagglomeration is measured (deagglomeration of the silica particles of 0.1 to tens of microns). The ultrasonic deagglomeration is performed with a VIBRACELL sound wave generator (600 W, produced by Bioblock, used at 80% of the maximum power output) equipped with a probe having a diameter of 19 mm. The granulometric measurement is carried out by laser diffraction on a MALVERN Mastersizer 2000 granulometric analyzer.

More specifically, the measurement is carried out by the following method.

1 g of silica is weighed in a pill box (6 cm in height and 4 cm in diameter), deionized water is added thereto to give a mass of 50 g, and thereby an aqueous suspension containing 2% of silica (this suspension is homogenized by magnetic stirring for 2 minutes) is prepared. Subsequently, ultrasonic deagglomeration is performed for 420 seconds, all the homogenized suspension is introduced into the vessel of the granulometric analyzer, and thereafter granulometric measurement is performed.

The distribution width W of the pore volume of the finely-divided silica is preferably 0.7 or more, more preferably 1.0 or more, further preferably 1.3 or more, and particularly preferably 1.5 or more. The pore distribution width W is preferably 5.0 or less, more preferably 4.0 or less, further preferably 3.0 or less, and particularly preferably 2.0 or less. Such broad pore distribution leads to improvement in silica dispersibility and provides desired performances.

The distribution width W of the pore volume of the silica may be measured by the following method.

The pore volume of the finely-divided silica is measured by mercury porosimetry. A silica sample is pre-dried in an oven at 200° C. for 2 hours. Subsequently, within five minutes after the sample is removed from the oven, the sample is put in a test receptacle, and degassed under vacuum. The pore diameter (AUTOPORE III 9420, porosimeter for powder technology) is calculated by Washburn's equation with a contact angle of 140° and a surface tension γ of 484 dynes/cm (or N/m).

The pore distribution width W may be determined from a pore distribution curve as in FIG. 1 shown by the function of pore diameter (nm) and pore volume (mL/g). More specifically, the diameter $X_s$ (nm) that gives the peak value $Y_s$ (mL/g) of the pore volume is recorded, the straight line of $Y=Y_s/2$ is drawn, and then the points a and b at which the straight line intersects the pore distribution curve are obtained. When the abscissas (nm) of the points a and b are $X_a$ and $X_b$ ($X_a>X_b$), respectively, the pore distribution width W is equivalent to $(X_a-X_b)/X_s$.

The diameter $X_s$ (nm) that gives the peak value $Y_s$ of the pore volume in the pore distribution curve of the finely-divided silica is preferably 10 nm or more, more preferably 15 nm or more, further preferably 18 nm or more, and particularly preferably 20 nm or more. The diameter $X_s$ is preferably 60 nm or less, more preferably 35 nm or less, further preferably 28 nm or less, and particularly preferably 25 nm or less. The diameter $X_s$ in such a range can provide finely-divided silica excellent in dispersibility and reinforcement. As a result, the effects of the present invention are favorably achieved.

In the rubber composition of the present invention, the amount of the finely-divided silica is preferably 5 parts by mass or more, more preferably 20 parts by mass or more, further preferably 40 parts by mass or more, and particularly preferably 50 parts by mass or more, per 100 parts by mass of the rubber component. If the amount is less than 5 parts by mass, sufficient reinforcement, mechanical strength, and abrasion resistance may not be achieved. The amount of the finely-divided silica is preferably 100 parts by mass or less, more preferably 90 parts by mass or less, and further preferably 85 parts by mass or less, per 100 parts by mass of the rubber component. If the amount exceeds 100 parts by mass, processability may be deteriorated, and good dispersibility may be less likely to be secured.

The rubber composition of the present invention preferably contains a silane coupling agent together with the finely-divided silica. Examples thereof include sulfide-type silane coupling agents, mercapto-type silane coupling agents, vinyl-type silane coupling agents, amino-type silane coupling agents, glycidoxy-type silane coupling agents, nitro-type silane coupling agents, and chloro-type silane coupling agents. Among these, preferred are sulfide-type silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide, and particularly preferred is bis(3-triethoxysilylpropyl) disulfide.

The rubber composition may optionally contain compounding ingredients generally used in the rubber industry, in addition to the aforementioned ingredients. Examples of the compounding ingredients include fillers such as carbon black, oils or plasticizers, antioxidants, age resistors, zinc oxide, vulcanizing agents such as sulfur and sulfur-containing compounds, and vulcanization accelerators.

The rubber composition of the present invention preferably contains carbon black. Examples of the usable carbon black include, but not particularly limited to, GPF, FEF, HAF, ISAF, and SAF. If the rubber composition contains carbon black, reinforcement can be improved. Accordingly, its use in combination with HPNR, BR, and finely-divided silica favorably achieves the effects of the present invention.

The nitrogen adsorption specific surface area ($N_2SA$) of the carbon black is preferably 20 $m^2/g$ or more, more preferably 35 $m^2/g$ or more, further preferably 70 $m^2/g$ or more, particularly preferably 100 $m^2/g$ or more, and most preferably 115 $m^2/g$ or more. If the $N_2SA$ is less than 20 $m^2/g$, sufficient reinforcement may not be achieved. The $N_2SA$ of the carbon black is preferably 200 $m^2/g$ or less, and more preferably 150 $m^2/g$ or less. If the $N_2SA$ is more than 200 $m^2/g$, the carbon black is less likely to be favorably dispersed.

The $N_2SA$ of the carbon black is determined in accordance with the A method of JIS K6217.

In the case where the rubber composition contains the carbon black, the amount of the carbon black is preferably 3 parts by mass or more, and more preferably 7 parts by mass or more, per 100 parts by mass of the rubber component. If the amount is less than 3 parts by mass, reinforcement and the like tend not to be improved. The amount of the carbon black is preferably 100 parts by mass or less, more preferably 50 parts by mass or less, further preferably 30 parts by mass or less, and particularly preferably 15 parts by mass or less, per 100 parts by mass of the rubber component. If the amount exceeds 100 parts by mass, dispersibility and processability tend to be deteriorated.

The total amount of silica and carbon black in the rubber composition is preferably 30 parts by mass or more, more preferably 50 parts by mass or more, and further preferably 60 parts by mass or more, per 100 parts by mass of the rubber component. If the total amount is less than 30 parts by mass, reinforcement and the like tend not to be improved. The total amount is preferably 120 parts by mass or less, and more preferably 100 parts by mass or less, per 100 parts by mass of the rubber component. If the total amount exceeds 100 parts by mass, dispersibility and processability tend to be deteriorated, and hardness tends to increase excessively.

The rubber composition of the present invention is produced by a common method. More specifically, the rubber composition is produced, for example, by a method including mixing the aforementioned ingredients with a mixing apparatus such as a Banbury mixer, a kneader, or an open roll mill, and then vulcanizing the resultant mixture. The rubber composition of the present invention is suitably used for a tread (cap tread) of a studless tire (in particular, for passenger vehicles).

The studless tire of the present invention is produced by a common method with the above rubber composition. More specifically, an unvulcanized rubber composition containing the aforementioned ingredients is extruded and processed into the shape of a tire component such as a tread, and then molded with other tire components in a common manner on a tire building machine to form an unvulcanized tire. Then, the unvulcanized tire is heated and pressurized in a vulcanizer to produce a studless tire according to the present invention.

EXAMPLES

The following will mention the present invention specifically with reference to Examples, but the present invention is not limited thereto.

The respective chemical agents used in Examples are listed below.
Natural rubber latex: Field latex obtained from Thaitex
Surfactant: Emal-E produced by Kao Corporation
NaOH: NaOH produced by Wako Pure Chemical Industries, Ltd.
NR: TSR
HPNR (saponified natural rubber): Preparation 1 mentioned below
BR: BR150B produced by UBE INDUSTRIES, LTD.
Carbon black: SHOBLACK N220 produced by CABOT JAPAN K.K. (nitrogen adsorption specific surface area ($N_2SA$): 125 $m^2/g$)
Silica 1: Zeosil 1115 MP produced by Rhodia (CTAB specific surface area: 105 $m^2/g$, BET specific surface area: 115 $m^2/g$, average primary particle size: 25 nm, aggregate size: 92 nm, pore distribution width W: 0.63, diameter Xs that gives pore volume peak in pore distribution curve: 60.3 nm)
Silica 2: Zeosil HRS 1200 MP produced by Rhodia (CTAB specific surface area: 195 $m^2/g$, BET specific surface area: 200 $m^2/g$, average primary particle size: 15 nm, aggregate size: 40 nm, D50: 6.5 µm, proportion of particles exceeding 18 µm in size: 5.0% by mass, pore distribution width W: 0.40, diameter Xs that gives pore volume peak in pore distribution curve: 18.8 nm)
Silica 3: Zeosil Premium 200 MP produced by Rhodia (CTAB specific surface area: 200 $m^2/g$, BET specific surface area: 220 $m^2/g$, average primary particle size: 10 nm, aggregate size: 65 nm, D50: 4.2 µm, proportion of particles exceeding 18 µm in size: 1.0% by mass, pore distribution width W: 1.57, diameter Xs that gives pore volume peak in pore distribution curve: 21.9 nm)
Silane coupling agent: Si266 produced by Evonik Degussa Japan Co., Ltd. (bis(3-triethoxysilylpropyl) disulfide)
Zinc oxide: Zinc white #2 produced by Mitsui Mining & Smelting Co., Ltd.
Stearic acid: Stearic acid "TSUBAKI" produced by NOF Corporation
Age resistor: Antigen 6C produced by Sumitomo Chemical Co., Ltd. (N-(1,3-dimethylbutyl)-N'-phenyl-p-phenylenediamine)
Wax: Sunnoc N produced by Ouchi Shinko Chemical Industrial Co., Ltd.
Aromatic oil: Process X-140 produced by Japan Energy Corporation
Sulfur: Sulfur powder produced by Tsurumi Chemical industry Co., Ltd.
Vulcanization accelerator: Nocceler CZ produced by Ouchi Shinko Chemical Industrial Co., Ltd. (N-cyclohexyl-2-benzothiazolyl sulfenamide)
(Production of Natural Rubber Saponified with Alkali)
Preparation 1

The solids content (DRC) of natural rubber latex was adjusted to 30% (w/v). Next, 1000 g of the natural rubber latex was added with 10 g of Emal-E and 20 g of NaOH and then saponified for 48 hours at room temperature, whereby a saponified natural rubber latex was produced. The saponified latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Then, the rubber was dried for two hours at 110° C., and thereby a solid rubber (saponified natural rubber) was obtained.

TSR and the solid rubber produced in Preparation 1 were determined for nitrogen content, phosphorus content, and gel content by the following methods. Table 1 shows the results.
(Determination of Nitrogen Content)

The nitrogen content was determined with CHN CORDER MT-5 (produced by Yanaco Analytical Instruments Corp.). In the determination, first, a calibration curve for determining the nitrogen content was prepared with antipyrine taken as a reference material. Then, a sample of TSR or the modified natural rubber produced in the Preparation was weighed out to about 10 mg and subjected to the determination. From three determination results, the average value was calculated and regarded as the nitrogen content of the sample.
(Determination of Phosphorus Content)
The phosphorus content was determined with an ICP emission spectrometer (ICPS-8100, produced by Shimadzu Corporation).
(Determination of Gel Content)
Each of raw rubber samples cut in a size of 1 mm×1 mm was weighed out to 70.00 mg, added with 35 mL of toluene, and allowed to stand for one week in a cool and dark place. Next, the mixture was centrifuged so that a toluene-insoluble gel fraction was precipitated, and a toluene-soluble supernatant was removed. Then, the gel fraction alone was solidified with methanol and dried. The mass of the dried gel fraction was measured, and then used in the following formula to determine the gel content (%).

Gel content (% by mass)=[Mass of dried gel fraction (mg)/Mass of original sample (mg)]×100

TABLE 1

|  | Saponified natural rubber (Preparation 1) | TSR |
|---|---|---|
| Nitrogen content (% by mass) | 0.12 | 0.33 |
| Phosphorus content (ppm) | 84 | 572 |
| Gel content (% by mass) | 5.5 | 26.9 |

As shown in Table 1, the saponified natural rubber (HPNR) was found to have a decreased nitrogen content, phosphorus content and gel content compared with TSR.

Examples 1 to 4 and Comparative Examples 1 to 3

In accordance with each formulation shown in Table 2, the chemical agents other than the sulfur and the vulcanization accelerator were mixed by a Banbury mixer to produce a mixture. Next, the sulfur and the vulcanization accelerator were added to the resultant mixture, and they were mixed with an open roll mill. Thereby, an unvulcanized rubber composition was produced. The unvulcanized rubber composition produced thereby was molded into the shape of a tread, and then assembled with other tire components to obtain an unvulcanized tire. The unvulcanized tire was then press-vulcanized for 10 minutes at 170° C. Thereby, a test tire (size: 195/65R15, studless tire for passenger vehicles) was produced.

The produced test tires were tested in the following ways.

(Rolling Resistance)
The produced test tires were mounted on rims (15×6JJ) and the rolling resistance was measured with a rolling resistance tester under the running conditions of: a tire inflation pressure of 230 kPa, a load of 3.43 kN, and a speed of 80 km/h. The rolling resistance of the test tire produced in Comparative Example 1 was regarded as 100, and the rolling resistance of the test tire of each formulation was expressed as an index by using the following equation. The larger the rolling resistance index is, the lower the rolling resistance is and the better the fuel economy is.

(Rolling resistance index)=(Rolling resistance of Comparative Example 1)/(Rolling resistance of each formulation)×100

(Abrasion Resistance)
The produced test tires were mounted on a vehicle, and the decrease in the depth of grooves in the tread pattern was measured after the vehicle had run 30000 km. The decrease in the depth of tire grooves of Comparative Example 1 was regarded as 100, and the decrease in the depth of tire grooves of each formulation was expressed as an index by using the following equation. The larger the abrasion resistance index is, the better the abrasion resistance is.

(Abrasion resistance index)=(Decrease in tire groove depth of Comparative Example 1)/(Decrease in tire groove depth of each formulation)×100

(Performance on Ice (Grip Performance on Ice))
The actual vehicle performance on ice was evaluated using test tires under the following conditions. The test tires were mounted on a domestic FR car of 2000 cc displacement. The test was carried out (on ice track) at Asahikawa Tire Proving Ground (Sumitomo Rubber Industries, Ltd.) in Hokkaido, Japan. The temperature on ice was −6 to −1° C.
Braking Performance (Brake Stopping Distance on Ice):
The stopping distance on ice was measured which was the distance required for the car to stop after the brakes that lock up were applied at 30 km/h. The stopping distance of the test tire of Comparative Example 1 was regarded as 100, and the stopping distance of the test tire of each formulation was expressed as an index by using the following equation. The larger the index is, the better the braking performance on ice is.

(Grip on ice index)=(Stopping distance of Comparative Example 1)/(Stopping distance of each formulation)×100

TABLE 2

|  | Example 1 | Example 2 | Example 3 | Example 4 | Comparative Example 1 | Comparative Example 2 | Comparative Example 3 |
|---|---|---|---|---|---|---|---|
| NR | — | — | — | — | 60 | 60 | — |
| HPNR | 60 | 60 | 60 | 60 | — | — | 60 |
| BR | 40 | 40 | 40 | 40 | 40 | 40 | 40 |
| Carbon black | 10 | 10 | 70 | 10 | 10 | 10 | 10 |
| Silica 1 | — | — | — | — | 60 | — | 60 |
| Silica 2 | 60 | — | — | — | — | — | — |
| Silica 3 | — | 60 | 10 | 80 | — | 60 | — |
| Silane coupling agent | 4.8 | 4.8 | 0.8 | 5 | 4.8 | 4.8 | 4.8 |
| Zinc oxide | 3 | 3 | 3 | 3 | 3 | 3 | 3 |
| Stearic acid | 2 | 2 | 2 | 2 | 2 | 2 | 2 |
| Age resistor | 1.5 | 1.5 | 1.5 | 1.5 | 1.5 | 1.5 | 1.5 |
| Wax | 1.5 | 1.5 | 1.5 | 1.5 | 1.5 | 1.5 | 1.5 |
| Aromatic oil | 20 | 20 | 20 | 20 | 20 | 20 | 20 |
| Sulfur | 1.8 | 1.8 | 1.8 | 1.8 | 1.8 | 1.8 | 1.8 |

TABLE 2-continued

|  | Example 1 | Example 2 | Example 3 | Example 4 | Comparative Example 1 | Comparative Example 2 | Comparative Example 3 |
|---|---|---|---|---|---|---|---|
| Vulcanization accelerator | 1.2 | 1.2 | 1.2 | 1.2 | 1.2 | 12 | 12 |
| Rolling resistance index | 104 | 103 | 102 | 105 | 100 | 90 | 105 |
| Abrasion resistance index | 110 | 115 | 102 | 112 | 100 | 115 | 95 |
| Grip on ice index | 103 | 103 | 101 | 105 | 100 | 103 | 100 |

The tire of Comparative Example 1, in which NR and BR as a rubber component and common silica (silica 1) were used, showed inferior overall performance in fuel economy, abrasion resistance, and grip performance on ice. In Comparative Example 2 in which silica 3 (finely-divided silica) was used instead of silica 1 used in Comparative Example 1, the abrasion resistance was improved; however, the fuel economy was greatly lowered. In Comparative Example 3 in which HPNR was used instead of NR used in Comparative Example 1, the fuel economy was improved; however, the abrasion resistance was greatly lowered. In contrast, in Examples in which HPNR, BR, and silica 2 or 3 (finely-divided silica) were used, these performances were not lowered and were improved in a well-balanced manner.

The invention claimed is:

1. A rubber composition for a tire, comprising a rubber component and silica,
    wherein the rubber component includes a modified natural rubber with a phosphorus content of 200 ppm or less, and butadiene rubber, and
    the silica has a CTAB specific surface area of 180 m$^2$/g or more and a BET specific surface area of 185 m$^2$/g or more.

2. The rubber composition for a tire according to claim 1, wherein the modified natural rubber has a gel content of 20% by mass or less, the gel content being determined as the content of a toluene-insoluble matter.

3. The rubber composition for a tire according to claim 1, wherein the modified natural rubber has no phospholipid peak in a range of −3 to 1 ppm in a $^{31}$P NMR measurement of a chloroform extract thereof and contains substantially no phospholipids.

4. The rubber composition for a tire according to claim 1, wherein the modified natural rubber contains 0.3% by mass or less of nitrogen.

5. The rubber composition for a tire according to claim 1, wherein the modified natural rubber is produced by saponifying natural rubber latex.

6. The rubber composition for a tire according to claim 1, wherein the silica has an aggregate size of 30 nm or more.

7. A studless tire for a passenger vehicle, comprising a tread formed from the rubber composition according to claim 1.

8. The rubber composition for a tire according to claim 1, wherein the amount of the modified natural rubber in 100% by mass of the rubber component is 30 to 80% by mass, the amount of the butadiene rubber in 100% by mass of the rubber component is 20 to 60% by mass, and the amount of the silica is 5 to 100 parts by mass per 100 parts by mass of the rubber component.

9. The rubber composition for a tire according to claim 1, wherein the D50 of the silica is 2.0 to 7.0 μm, the proportion of the silica whose particle size is larger than 18 μm is 6% by mass or less, the distribution width W of the pore volume of the silica is 0.7 to 5.0, and the diameter Xs that gives the peak value Ys of the pore volume in the pore distribution curve of the silica is 10 to 60 nm.

10. The rubber composition for a tire according to claim 1, which further contains the carbon black, the nitrogen adsorption specific surface area of the carbon black being 115 to 150 m$^2$/g.

11. The rubber composition for a tire according to claim 1, which further contains the carbon black, the amount of the carbon black being 3 to 100 parts by mass per 100 parts by mass of the rubber component.

12. The rubber composition for a tire according to claim 1, which further contains the carbon black, and the total amount of the silica and the carbon black in the rubber composition is 30 to 120 parts by mass per 100 parts by mass of the rubber component.

13. A studless fire for a passenger vehicle, comprising a tread formed from the rubber composition according to claim 2.

14. A studless tire for a passenger vehicle, comprising a tread formed from the rubber composition according to claim 8.

15. A studless tire for a passenger vehicle, comprising a tread formed from the rubber composition according to claim 9.

16. A studless tire for a passenger vehicle, comprising a tread formed from the rubber composition according to claim 10.

17. A studless tire for a passenger vehicle, comprising a tread formed from the rubber composition according to claim 11.

18. A studless tire for a passenger vehicle, comprising a tread formed from the rubber composition according to claim 12.

19. A studless tire for a passenger vehicle having a tread formed from a rubber composition comprising a rubber component and silica,
    wherein the rubber component includes a modified natural rubber with a phosphorus content of 200 ppm or less, and butadiene rubber, wherein the amount of the modified natural rubber in 100% by mass of the rubber component is 30 to 80% by mass, and the amount of the butadiene rubber in 100% by mass of the rubber component is 20 to 60% by mass; and
    the silica has a CTAB specific surface area of 180 m$^2$/g or more and a BET specific surface area of 185 m$^2$/g or more, the amount of the silica is 5 to 100 parts by mass per 100 parts by mass of the rubber component, the D50 of the silica is 2.0 to 7.0 μm, the proportion of the silica whose particle size is larger than 18 μm is 6% by mass or less, the distribution width W of the pore volume of the silica is 0.7 to 5.0, and the diameter Xs that gives the peak value Ys of the pore volume in the pore distribution curve of the silica is 10 to 60 nm.

* * * * *